United States Patent Office 3,301,812
Patented Jan. 31, 1967

3,301,812
CLAY COMPOSITION AND USE OF SAME IN TREATMENT OF EXPANDABLE POLYSTYRENE BEADS
Thomas H. Ferrigno, Metuchen, N.J., assignor to Minerals & Chemicals Philipp Corporation, Menlo Park, N.J., a corporation of Maryland
No Drawing. Filed Jan. 28, 1964, Ser. No. 340,784
3 Claims. (Cl. 260—32.6)

This invention has to do with an organic-treated clay product and to a composite granular foamable polystyrene product containing the organic-treated clay material as an agent for alleviating several problems normally encountered during the production of foamed polystyrene plastics from foamable (expandable) polystyrene granules.

Expandable thermoplastic polystyrene beads or pellets are made by either an emulsion polymerization technique or by extrusion. These granular particles contain a volatile solvent for the styrene polymer, usually 5% to 8% by weight pentane or isopentane. The normally solid nonporous beads or pellets are molded and expanded by heating them to a temperature of about 212° F. As a result of the heat treatment, the blowing agent vaporizes and partially plasticizes the heat softened plastic.

In a preferred technique for making foamed polystyrene goods, the foaming and molding takes place in two distinct stages. In the first stage, the beads are pre-expanded to a density slightly less than that of the finished molding. In a typical case, the volume of the beads increases by a factor of 20.5 and the surface area by a factor of 12.5. Pre-expansion is usually carried out in an agitated steam-fed drum on a continuous basis. The beads are fed to the bottom of the drum and, as they are expanded, they rise to a top opening in the drum. From this outlet, the partially expanded beads (so-called "prepuffs") are conveyed by means of a centrifugal fan to ventilated storage bins. Here they are dried and cooled. In the second stage of the processing, the expansion of the beads is completed and the completely expanded beads are fused into a coherent molded article. This is done in steam jacketed molds.

When expandable normally solid polystyrene granules are heat expanded into foamed plastic goods by the multistage process described above, a serious problem arises as a result of the fact that the prepuffs normally tend to adhere to each other and to form strongly bonded clumps or agglomerates. Undesirable, but unavoidable partial fusion of beads to each other during the pre-expansion step accounts for the clumping of beads into these strongly bonded clumps or agglomerates. Frequently, incipient fusion between prepuffs is so extensive that the bonds between the prepuffs cannot be broken by simple shaking or by other mild agitation even after the beads have been dried.

The presence of clumped prepuffs which cannot be separated into discrete partially expanded beads by mildly shaking causes serious problems in the plant. In the first place, clumps of prepuffs cannot be conveyed properly through the processing plant since the prepuffs must be conveyed as discrete free-flowing entities. Moreover, it is essential to the provision of plastic foams of suitable physical properties to charge the molds with prepuffs in the form of discrete masses. The presence of clumps of prepuffs in the mold will result in a foamed plastic molding which undesirably varies in density from one part to another. Also, voids will invariably be present in moldings obtained with clumped prepuffs, impairing product quality. To alleviate clumping of foamable polystyrene particles it has been suggested in U.S. Patent No. 3,086,885 to Alex K. Jahn to coat the surface of expandable polystyrene beads or pellets with 0.0005% to 0.0500% by weight of a fluid siloxane polymer. The polymer is applied by spraying a dilute emulsion or solution of the polymer on the beads, following which the beads are carefully dried and then molded.

While not responsible for the problem of clumping, the high level of static electricity generated in the beads during initial expansion causes problems unique to this particular type of plastic manufacturing operation. Firstly, an explosion hazard is present because the charged prepuffs contain residual volatile blowing agent. The presence of static electricity in the prepuffs also accounts for the fact that it is extremely difficult to confine the charged, lightweight prepuffs within processing equipment. Such particles tend to float out of the processing equipment. The unconfined lightweight particles cling tenaciously to walls and even to the bodies of plant personnel.

Attempts have been made to prevent static buildup in the prepuffs by coating the beads before expansion with antistatic material, especially organic antistatic agents of the type used in processing other plastic goods. These attempts have been unsuccessful. When employed in quantity effective to reduce static electricity to a satisfactory extent, the presence of such agents on the bead surfaces aggravates the normal tendency of the beads to stick or clump after they undergo initial expansion.

An object of this invention is the provision of a powdered agent which when dry tumbled with expandable polystyrene particles is extremely effective in preventing agglomeration or clumping of the particles after they are pre-expanded by heat without interfering with the ability of the pre-expanded beads to bond together upon subsequent further heat expansion, which agent also effectively dissipates static electricity in the prepuffs.

Another object is to achieve the foregoing without imparting objectionable dustiness to the expandable beads.

A specific object is the provision of a novel finely divided clay product containing a mixture of organic amides, which product is especially useful as an agent for conditioning expandable polystyrene beads when dusted and coated on the surface of the beads.

Further objects and features of this invention will be readily apparent from a description thereof which follows:

Stated briefly, the powdered coating agent for conditioning expandable styrene beads against both clumping and static buildup comprises clay, especially kaolin clay, coated with a small amount of the combination of two particular types of surface active amides, namely, (1) a cationic, normally solid higher fatty acid (or resin acid) amido propyl hydroxyalkyl quaternary nitrogen compound and (2) a nonionic, normally solid polyethoxylated fatty acid amide.

The clay coated with the combination of cationic and nonionic surface active amides is more effective in preventing processing difficulties than is the uncoated clay. The coated clay is also more effective than either one of the amides when used singly with the clay or when the amide is coated directly on the polystyrene beads without clay carrier. For example, when the uncoated clay is applied to the beads in amount sufficient to curtail clumping of the incompletely foamed beads, static buildup in the beads may be increased, not decreased as desired. Moreover, the clay does not adhere well to the beads in the absence of nonionic amide coating material. As a result, the uncoated clay or clay coated only with cationic amide separates from the beads when the unexpanded beads are conveyed through tubes to the pre-expansion chamber. This results in clogging of the tubes by the steam-wetted clay. When the cationic amide is coated directly on the beads in amount sufficient to reduce static electricity to the desired low level, clumping is aggravated. On the other hand, when the clay is coated with the nonionic amide alone without the cationic amide and the resulting amide coated clay is applied to styrene polymer beads, static buildup is decreased somewhat. However, the amount of static electricity on the beads will usually be much greater than it would be if the cationic amide were substituted for a major part of the amide that is coated on the clay. Also, the beads may clump to a markedly greater extent when the nonionic amide is used as the sole coating for the clay conditioning agent.

A surprising feature of the clay conditioning agent of this invention is that it produces such outstanding results in preventing clumping since clumping is caused by fusion and is not a manifestation of the presence of static electricity. The reason why this particular clay material containing a combination of amides was so efficient as a parting agent for polystyrene prepuffs, as well as being an antistatic material, is not presently understood fully.

In carrying out this invention, I prefer to use a substantially pure grade of well-crystallized kaolin clay. The term "kaolin clay" as used herein refers to a two-layer hydrous aluminosilicate mineral of the approximate empirical formula $Al_2O_3 \cdot 2SiO_2 \cdot 2H_2O$. The mineral species of kaolin clay is usually kaolinite, although clays composed of nacrite, dickite, and anauxite (all of which are platy minerals characterized by the formula given above) can be used. The kaolin clay employed in carrying out this invention should be refined by removing material that is plus 325 mesh (44 microns). Whole clay or a fine or coarse size fraction of degritted kaolin clay can be used. Kaolin clay having an average particle size within the range of about 0.5 to about 5.0 microns e.s.d. is suitable. The use of a coarse size fraction of clay having an average particle size within the range of 3.0 to 5.0 microns is especially recommended. Present experience indicates that markedly improved adhesion of amide coated clay to unfoamed bead is realized with a coarse size fraction of clay. All micron size values mentioned herein refer to values determined by the Casagrande sedimentation method described in an article by Norton and Speil, J. Am. Ceram. Soc., 21, 89–97 (1938). Typical samples of high purity well-crystallized kaolin clay have a low surface area, usually within the range of 5 to 15 square meters per gram, as measured by the B.E.T. nitrogen adsorption method described by Brunauer, Emmett and Teller, J. Am. Chem. Soc., 60, 309 (1938), using molecular size data given by Livingston, J. Am. Chem. Soc., 66, 569 (1944).

The polyoxyethylated amides that I employ in the formation of my conditioning agent for foamable polystyrene particles may be represented by the following formula:

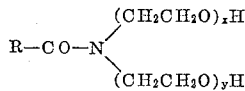

wherein R is an aliphatic group having at least 11 carbon atoms and $x$ and $y$ are integers each having a value of at least 1 and totalling between 2 and 50, inclusive.

As representative of R—C in the formula, the following may be mentioned: dodecyl, dodecenyl, tetradecyl, tetradecenyl, hexadecyl, hexadecenyl, octadecyl, octadecenyl, and octadecadienyl; also mixtures of long-chain aliphatic radicals such as found in naturally occurring fatty acid mixtures obtained from animal oils and vegetable oils. For example, R—C may be derived from coconut oil and comprises a mixture of hexyl, octyl, decyl, dodecyl, tetradecyl, hexadecyl, octadecyl, octadecenyl, and octadecadienyl radicals. R—C may be derived from soybean oil and comprises a mixture of hexadecyl, octadecyl, eicosyl, octadecyl, octadecadenyl and octadecadienyl radicals. When derived from tallow, R—C comprises a mixture of the following radicals: dodecyl, tetradecyl, hexadecyl, hexadecenyl, octadecyl, octadecenyl, octadeca-dienyl and eicosyl. Present experience indicates that optimum results will be realized when $x+y$ in the formula equals 15. However, with many grades of polystyrene beads, the results may be expected to be equally good when $x+y$ is within the range of 15 to 50.

Suitable ethoxylated fatty amides are known by the trademark Ethomid, e.g., Ethomid 18/25, Ethomid C/25 and Ethomid O/12. The letters or numbers preceding the slant bar indicate the fatty acid from which the amide was derived, e.g., Ethomid C/25 is derived from coconut oil and Ethomid 18/25 is derived from stearic acid. The numbers following the slant bar indicate, after subtracting 10, the total number of molecules of ethylene oxide which have been reacted with one molecule of the fatty amide. The probable structures of Ethomid HT/25 is illustrative:

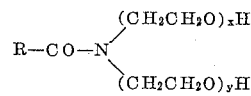

wherein R—C is derived from hydrogenated tallow fatty acids and $x+y=15$.

The higher fatty acid (or resin acid) amido propyl hydroxyalkyl quaternary nitrogen compounds I use are materials of the general formula:

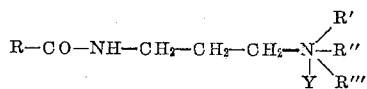

wherein R is a member of the group consisting of alicyclic and aliphatic groups containing at least 7 carbon atoms, R' and R'' are members of the group consisting of alkyl and hydroxyalkyl radicals each having from 1 to 3 carbon atoms, inclusive, R''' is a hydroxyalkyl radical having from 1 to 3 carbon atoms, inclusive, and Y is an anion.

As representative members of R—C in the above formula, the following may be mentioned: octyl, nonyl, decyl, undecyl, dodecyl, dodecenyl, tetradecyl, tetradecenyl, hexadecyl, hexadecenyl, octadecyl, octadecenyl, octadecadienyl and abietyl (the residue of abietic acid). R—C may also be derived from mixtures of long-chain aliphatic radicals such as those found in natural fatty acid mixtures obtained, for example, from coconut oil, cottonseed oil, soybean oil or lard oils. Examples of R' and R'' are methyl, ethyl, propyl, isopropyl, hydroxylpropyl and dihydroxypropyl. Some examples of hydroxyalkyl radicals represented by R''' are hydroxyethyl, hydroxypropyl, hydroxyisopropyl, dihydroxypropyl, etc. As illustrative examples of anions that are represented by Y may be mentioned chlorine, bromine, fluorine, iodine, sulfate, sulfonate, phosphate, hydroxide, borate, cyanide, carbonate, hydrocarbonate, thiocyanate, thiosulfate, isocyanate sulfite bisulfite, nitrate, nitrite, oxalate, silicate, sulfide, cyanate, acetate and other common inorganic anions.

Species of suitable higher fatty acid amido propyl hydroxyalkyl quatenary nitrogen compounds include abietamidopropyl dimethyl-beta'-hydroxyethyl ammonium chloride, oleylamidopropyl ethyldihydroxyethyl ammonium chloride, octadecadienylamidopropyl diethyl-beta'-hydroxymethyl ammonium bromide, stearamidopropyl dimethyl-beta'-hydroxyethyl ammonium nitrate, stearamidopropyl dipropyl-beta'-hydroxypropyl ammonium chloride, soyaamidopropyl dimethyl-beta'-hydroxyethyl ammonium chloride, cocoamidopropyl dimethyl-beta'-hydroxyethyl ammonium hydroxide, gamma-stear-amidopropyl dimethyl - beta' - hydroxyethyl ammonium phosphate, gamma-stearamidopropyl dimethyl - beta'-hydroxyethyl ammonium sulfate, gamma-stearamido-propyl tris(beta'-hydroxyethyl) ammonium chloride. The preparation of suitable higher fatty acid amido propyl hydroxyalkyl quaternary nitrogen compounds is described in U.S. Patent No. 2,626,876 to Joseph J. Carnes.

The cationic and nonionic treating agents are employed in combined amount within the range of 3% to 10% of the clay weight, moisture free clay weight basis. The presence of less than 3% total amide in the clay conditioning agent is usually inadequate to achieve the desired degree of destaticization and/or prevention of clumping. Preferably a total of at least 6% amide is used with the clay. On the other hand, no benefit appears to be realized by using appreciably more than 8% total amide. In fact, the presence of appreciably more than 10% total amide on the clay may aggravate clumping, not minimize clumping as desired. The cationic amide is employed in a major proportion by weight as compared with the nonionic amide. A weight ratio of 2 to 9 parts of cationic amide to 1 part by weight of nonionic material is suitable for use with the clay. Especially good results have been realized when the cationic amide was used in amount of 5% to 7% of the clay weight and the ethoxylated amide was employed in amount of 1% of the clay weight.

The amide clay-treating agents can be coated on the finely divided particles of clay by coating procedures well known to those in the art. Since the effectiveness of the coated clay particles depends on the uniformity of the distribution of the amide coating materials on the clay particles, the particular coating procedure that is used must assure the deposition of a substantially uniform coating of the mixture of amide materials on the surface of individual clay particles. I prefer to slurry the clay with a mixture of the organic clay-treating materials in a vehicle which boils at a temperature below which either of the amides is decomposed. This vehicle can be water, an organic liquid or mixtures thereof. The slurry is dried at a temperature below which either of the amides decomposes. Normally, the resulting dried product will be a pulverulent free-flowing mass. If necessary this mass can be ground to minus 44 microns.

The free moisture of the amide coated kaolin clay should be less than 1% of the weight of the coated clay and is preferably less than 0.5% of the weight of the coated clay. Free moisture is determined by heating a material to essentially constant weight at 225° F.

The styrene polymer granules to which this invention is applicable include particles composed of various homopolymers of styrene and interpolymers of styrene containing a preponderating weight percentage of styrene. Reference is made to U.S. Patent No. 2,861,898 to Norbert Platzer for an enumeration of styrene polymers to which this invention is applicable. As mentioned in U.S. Patent No. 2,861,898, the styrene can be replaced in whole or in part by its closely related homologs (e.g., alphamethylstyrene, o-, m-, and p-methylstyrene, o-, m-, and p-ethylstyrene and 2,4-dimethylstyrene). The term "styrene polymer" as used in the specification and in the claims is intended to encompass the various homopolymers and interpolymers (including copolymers) of styrene that are enumerated in U.S. Patent No. 2,861,898. The granules are usually available in the form of beads within the range of 10 to 30 mesh.

The styrene polymer particles employed in carrying out this invention have incorporated therein as a foaming agent an organic solvent which boils at a temperature below which the polymer softens. Preferred foaming agents are aliphatic hydrocarbons or hydrocarbon mixtures which have a boiling point within the range of about 50° F. to about 175° F. As mentioned, commercially available styrene polymer beads are normally supplied with from 5% to 8% by weight of n-pentane or isopentane incorporated therein as the blowing agent. However, other volatile organic compounds, such as those enumerated in U.S. Patent No. 2,861,898, can be employed as the blowing agent within the scope of this invention.

To produce destaticized free-flowing foamable polystyrene beads which do not stick before or after pre-expansion, the coated kaolin clay composition is employed in amount within the range of about ¼% to about 2%, and preferably in amount within the range of ½% to 1%, based on the weight of the beads (inclusive of the weight of blowing agent contained in the beads). When employed in amount appreciably less than ½%, the effectiveness of the clay-containing composition in preventing lumping and static buildup in the beads is diminished. Quantities of coated clay appreciably in excess of about 1% may interfere with the fusion of the prepuffs and thereby impair the properties of the molding.

To deposit the clay composition on the expandable styrene polymer beads, the beads can be tumbled with the coated clay at ambient temperature or at a temperature below which the foaming agent has appreciable vapor pressure. Normally, a tumbling period of only a few minutes will suffice. The bead coating step can be carried out in any agitated equipment, especially tumbling equipment, such as in a horizontal drum rotating about its axis. When the beads are made by emulsion polymerization, the clay-treating step can be carried out during the drying operation.

The following examples are given to illustrate the invention and its benefits.

*Example I*

In accordance with this invention, a dual purpose conditioning agent for expandable polystyrene beads was obtained by coating kaolin clay with the combination of 7% by weight stearamidopropyl dimethyl-B′-hydroxyethyl ammonium nitrate and 1% by weight hydrogenated tallow amide ethoxylated with a total of 15 mols ethylene oxide.

The clay used was a blend of coarse size fractions of water-washed Georgia kaolin clay. The blend had an average particle size of about 3 microns e.s.d., with about 90% by weight of the particles being minus 10 microns and about 25% minus 1 micron (Casagrande method). The oil absorption value of the mixture was about 28 to 35 (by ASTM D281–31). Before coating the clay, the ethoxylated amide (Ethomid HT/25) was melted by heating it to 160° F. and the molten amide was mixed into a 50% solution of the hydroxylated quaternary salt in a mixture of alcohol and water (the solution being supplied commercially as "Catanac SN"). The solution was dripped on the clay while the clay was agitated in a Waring Blendor. The mixture of clay and amides was then dried to remove all solvent at an oven temperature of 160° F., producing a powder having an unctuous texture. The free moisture content of the coated clay was below 1%.

This coated clay powder was coated on samples of commercial expandable polystyrene beads. Four different types of expandable polystyrene beads were used, namely: a gasoline-resistant type; a grade especially produced for thin moldings; a self-extinguishing type; and a general purpose bead, understood to have been treated with a polysiloxane to prevent clumping. To coat the beads with the amide-coated clay powder, the clay material was lightly tumbled with the beads in a rotating vessel for 3 minutes at room temperature of about 75° F. The coated beads were found to be dust free.

The coated beads and uncoated control bead sample were then pre-expanded and molded. The equipment used to pre-expand the beads consisted of an insulated drum with a tangentially entering steam inlet at the bottom periphery. A wire screen basket was suspended in the drum for housing the beads and a loose fitting wood lid was used to form a steam chamber. The beads were pre-expanded for the times and at the steam supply pressures indicated in the table.

Immediately after pre-expansion, the beads were dumped on brown wrapping paper for drying. To determine the degree of agglomeration immediately after pre-expansion, a count of separated and agglomerated beads was made. The percentage of beads existing as agglomerates of two or more beads was reported as "Percent Agglomeration."

After 15 minutes drying, the beads were shaken lightly on screens having sufficiently large openings to pass single beads. This was done to evaluate the extent of clumping. Qualitative differences were readily determined and were rated according to the amount of mechanical force required to break the clumps into the individual beads.

To determine the static charge on the dried pre-expanded beads, a ⅜-inch glass rod rubbed 35 strokes with a new lamb's wool pad was used. The glass rod was washed with a highly conductive solution of an alkyl aryl sodium sulfonate detergent (Alconox), rinsed, and carefully dried between tests. In testing for relative static charge on dry pre-expanded beads, the volume (in ml.) of beads clinging to the charged rod was measured and used as an indication of static potential. In making the evaluation, the rod was inserted to a fixed depth into a container of the dried pre-expanded beads and carefully withdrawn.

For molding, an 8 ounce aluminum cup was drilled with uniformly spaced 1/16-inch holes and placed in a jig to hold the flat top securely in place. The flat top had a hole drilled in its center for insertion of a 3/16-inch copper pipe steam probe which had been drilled with uniformly spaced 1/16-inch holes and had a flattened sealed end. The cup was filled with dried pre-expanded beads and placed in the jig. The steam probe was carefully inserted through the hole into the beads and held firmly in place by a clamp. The steam was turned on and maintained for the time and at the pressure reported in the table. The probe was withdrawn immediately after the steam treatment was finished. Thirty seconds after probe removal, the entire jig was placed under a cold water faucet and was rotated while cooling for 30 seconds. The molding was then ejected from the cup by blowing compressed air through the drilled holes in the cup.

The results are summarized in the following table.

Example II

To demonstrate the desirability of using the combination of cationic and nonionic amides in a clay conditioning agent for expandable styrene beads, kaolin clay was coated with from 5% to 10% stearamidopropyl dimethyl-beta'-hydroxyethyl ammonium nitrate without a nonionic amide. The clay was a commercial coarse size fraction of kaolin having an average particle size of 4.8 microns (e.s.d.) and it was coated with a solution of the cationic amide (Catanac SN) and then dried by the procedure described in the preceding example. The dry coated clay material was applied to the surface of samples of expandable polystyrene beads that were used in Example I. In coating the beads with the coated clay, samples of the beads were tumbled with from ½% to 1% by weight of the coated clay.

It was found that the beads were undesirably dusty when any of the clays coated with the cationic amide as the sole coating agent was used in amount sufficient to reduce static to a desirably low level. This result therefore demonstrates the desirability of coating the clay with a combination of amides including an ethoxylated amide.

I claim:

1. A destaticized free-flowing composition comprising discrete particles of a normally solid nonporous foamable styrene polymer which particles when expanded by heating are normally susceptible to agglomeration of particles one to each other and to buildup of electrical charge, and having on the surface of said particles from ½% to 2% of an adherent coating consisting of minus 44 micron particles of kaolin clay having an average particle size within the range of about 0.5 to about 5.0 microns, the surfaces of which are uniformly coated with a mixture of at least one normally solid cationic amide (a) and at least one normally solid nonionic amide (b) in amount of 1 part by weight to 2 to 9 parts by weight of said cationic amide

| Type of Expandable Polystyrene Beads | Gasoline Resistant | | For Thin Moldings | | Self-extinguishing | | General Purpose | |
|---|---|---|---|---|---|---|---|---|
| Wt. percent coated kaolin [1] on beads | 0 | 1.0 | 0 | 1.0 | 0 | 0.5 | 0 | 0.5 |
| Pre-expanded 20 secs., 10 p.s.i. steam: | | | | | | | | |
| Agglomeration immediately after pre-expansion, percent | 95 | None | 100 | 90 | 100 | 50 | 90 | 90 |
| Ease of separation of agglomerated beads after drying | (2) | (3) | (2) | (4) | (2) | (4) | (4) | (4) |
| Static charge after drying (relative), ml | 10.0 | 0.1 | 3.8 | 0.4 | 6.0 | 0.1 | 2.0 | 0.1 |
| Density of molded foam produced, lb./ft.³ | 2.0 | 2.0 | 2.44 | 2.44 | 1.88 | 1.76 | 2.12 | 2.03 |

[1] Clay containing 7% by weight stearamidopropyl dimethyl-B'-hydroxyethyl ammonium nitrate and 1% by weight hydrogenated tallow amide ethoxylated with 15 mols ethylene oxide.
[2] Difficult.
[3] Very easy.
[4] Easy.

Data in the table show that with all of the expandable styrene beads, except for the general purpose beads that were understood to be precoated with polysiloxane, the use of clay coated with a combination of cationic and nonionic amides reduced significantly the normal tendency of the beads to clump after steam expansion and further weakened substantially the mechanical bonds between any clumps that were formed. This benefit was especially notable in the case of the gasoline resistant beads which normally present a serious problem. When conditioned with my clay product, these beads could be readily maintained in discrete free-flowing form after expansion. With all of the beads static charge was reduced substantially by the treatment. This was true even in the case of the polysiloxane coated beads, since in this case a substantial reduction in static charge was realized by the clay treatment.

The data show also that the clay conditioning agent for the beads did not adversely affect foam density.

(a), said amide (a) being a material of the general formula:

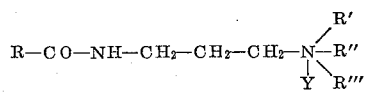

wherein R is a member of the group consisting of aliphatic and alicylic radicals containing 7 to 17 carbon atoms, R' and R" are members of the group consisting of alkyl and hydroxyalkyl radicals each having from 1 to 3 carbon atoms, inclusive, R'" is a hydroxyalkyl radical having from 1 to 3 carbon atoms, inclusive, and Y is an anion, said compound (b) being a material of the general formula:

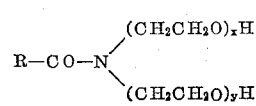

wherein R is an aliphatic radical having 11 to 17 carbon atoms and $x$ and $y$ are integers each having a value of at least 1 and totalling between 2 and 50.

2. A destaticized free-flowing composition consisting essentially of discrete particles of a normally solid non-porous foamable styrene polymer which particles when expanded by heating are normally susceptible to agglomeration of particles one to each other and to buildup of static electrical charge and having on the surface of said particles from ½% to 2% of an adherent substantially dust-free coating consisting of minus 44 micron particles of a coarse size fraction of kaolin clay having an average particle size within the range of about 0.5 to about 5.0 microns, the surfaces of which have previously been uniformly coated with from 6% to 8%, based on the weight of said clay, of a mixture of 5 to 7 parts by weight of stearamidopropyl dimethyl-beta'-hydroxyethyl ammonium nitrate with 1 part by weight of hydrogenated tallow amide ethoxylated with a total of 15 ethoxy groups.

3. The composition of claim 1, wherein said powder consists essentially of said clay, and said amides (a) and (b).

References Cited by the Examiner

UNITED STATES PATENTS

| | | |
|---|---|---|
| 2,589,674 | 3/1952 | Cook et al. |
| 2,739,075 | 3/1956 | Iler. |
| 3,029,209 | 4/1962 | Ferrigno. |
| 3,056,752 | 10/1962 | Zweigle. |
| 3,172,867 | 3/1965 | Showalter. |
| 3,197,425 | 7/1965 | Konig et al. _____ 260—32.6 |

MORRIS LIEBMAN, *Primary Examiner.*

L. T. JACOBS, *Assistant Examiner.*